(12) United States Patent
Rangayya et al.

(10) Patent No.: US 11,392,403 B2
(45) Date of Patent: *Jul. 19, 2022

(54) INDIVIDUALIZING VIRTUAL HARDWARE CONFIGURATIONS OF DEPLOYED DESKTOP VIRTUAL MACHINES USING CUSTOM RESOURCE TEMPLATES

(71) Applicant: VMware, Inc., Palo Alto, CA (US)

(72) Inventors: Sandeep Rangayya, Bangalore (IN); Sendhil Kumar, Bangalore (IN); S. Muthuvel Pari, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/656,460

(22) Filed: Oct. 17, 2019

(65) Prior Publication Data

US 2020/0050474 A1 Feb. 13, 2020
US 2022/0188134 A9 Jun. 16, 2022

Related U.S. Application Data

(63) Continuation of application No. 14/489,481, filed on Sep. 18, 2014, now Pat. No. 10,474,485.

(30) Foreign Application Priority Data

Aug. 7, 2014 (IN) .......................... 3886/CHE/2014

(51) Int. Cl.
*G06F 9/455* (2018.01)

(52) U.S. Cl.
CPC .............. *G06F 9/45558* (2013.01); *G06F 2009/45562* (2013.01)

(58) Field of Classification Search
CPC .............. G06F 9/45558; G06F 2009/45562
See application file for complete search history.

(56) References Cited

U.S. PATENT DOCUMENTS

| 8,732,699 | B1 | 5/2014 | Hyser et al. |
| 10,474,485 | B2 | 11/2019 | Rangayya et al. |
| 2007/0089111 | A1 | 4/2007 | Robinson et al. |
| 2007/0171921 | A1* | 7/2007 | Wookey ............... G06F 9/5027 370/401 |
| 2011/0078680 | A1 | 3/2011 | Lagergren et al. |
| 2011/0265076 | A1* | 10/2011 | Thorat ............... G06F 9/45533 717/172 |

(Continued)

*Primary Examiner* — Wissam Rashid
(74) *Attorney, Agent, or Firm* — Patterson & Sheridan LLP

(57) ABSTRACT

Techniques for achieving virtual hardware resources that are individualized across desktop virtual machines (VMs) are identified. Custom resource templates include virtual resource settings that are targeted for specified desktop VMs and that differ from the parent image (i.e., a template or snapshot). A customization manager processes the custom resource templates and applies the corresponding virtual resource settings directly to the specified desktop VMs. To achieve such customization using conventional techniques requires tedious and error-prone manual intervention as well as memory and time-consuming individualized recompose or re-creation operations. Advantageously, by automating and streamlining the customization process, the identified techniques decrease both memory usage and the time required to individualize the desktop VMs.

20 Claims, 5 Drawing Sheets

(56) References Cited

U.S. PATENT DOCUMENTS

2013/0283263 A1     10/2013  Elemary
2013/0326505 A1*    12/2013  Shah .................. G06F 8/61
                                                    718/1
2014/0149983 A1*     5/2014  Bonilla ............ G06F 3/0619
                                                    718/1
2015/0058988 A1*     2/2015  Katz ................ H04L 63/1416
                                                    726/23

* cited by examiner

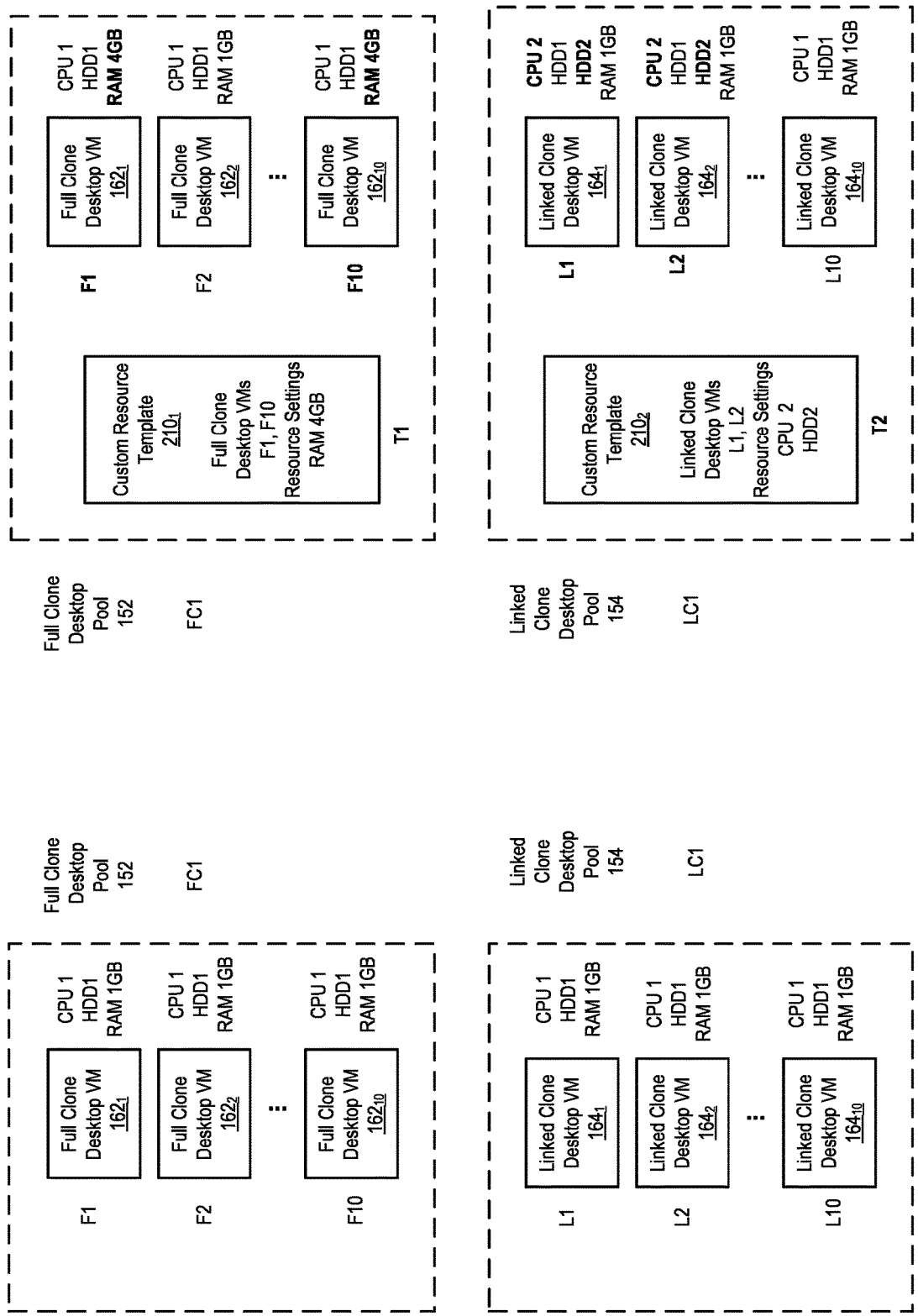

INDIVIDUALIZING VIRTUAL HARDWARE CONFIGURATIONS OF DEPLOYED DESKTOP VIRTUAL MACHINES USING CUSTOM RESOURCE TEMPLATES

CROSS-REFERENCE TO RELATED APPLICATIONS

This application is a continuation of U.S. patent application Ser. No. 14/489,481, filed Sep. 18, 2014. The content of the application is hereby incorporated by reference in its entirety. U.S. patent application Ser. No. 14/489,481, filed Sep. 18, 2014, further claims the benefit of Indian Patent Application No. 3886/CHE/2014, filed Aug. 7, 2014, and therefore the present application also claims the benefit of Indian Patent Application No. 3886/CHE/2014.

BACKGROUND

For ease of deployment, software management, and hardware cost reduction reasons, virtual machines (VMs) running in computer systems are often used to support virtual desktops for use in an organization in place of physical workstations. The virtual desktops execute within the VMs, and the combination of a desktop and a VM is referred to herein as a "desktop VM" Each desktop VM is typically created as a copy of an existing parent VM as a "full clone" or a "linked clone."

A full clone is an independent copy of the parent VM that shares nothing with the parent VM after the cloning operation. By contrast, a linked clone is copied from a replica VM derived from a snapshot (i.e., preserved state) of the parent VM. After the cloning operation, the linked clones share virtual disks with the replica VM. All clones that are created from the same parent VM are initially configured with the same virtual hardware resources (e.g., number of virtual central processing units, amount of memory, etc.) as the parent VM and each other.

To accommodate varying needs and priorities across organizations, the virtual hardware resources of individual desktop VMs may be customized. For instance, any number of desktop VMs may be optimized to execute high priority and computationally intensive work by increasing the number of CPUs compared to the parent VM. To differentiate the virtual hardware resources for targeted full clones, an administrator either manually configures each desktop VM or creates new parent VMs—one for each different configuration. Similarly, to differentiate the virtual hardware resources for targeted linked clones, the administrator creates a new, individualized snapshot and an additional replica VM for each different configuration.

Because re-configuring the virtual hardware resources is a per-configuration, predominantly manual process, customizing desktop VMs is time consuming and error-prone, Further, this process requires additional memory and storage to support different parent VMs and/or replica VMs. For example, if a pool of 2000 desktop VMs are configured as linked clones, and 200 of these desktop VMs are customized to reflect 10 different sets of virtual hardware resources, then at least one parent VM with 10 different snapshots and 10 corresponding replica VMs are generated. Consequently, a more efficient approach to customizing virtual hardware resources across desktop VMs is desirable.

SUMMARY

One or more embodiments provide techniques to customize virtual hardware resources for desktop virtual machines (VMs). A method for customizing virtual hardware resources for desktop virtual machines (VMs) includes the steps of receiving a custom resource template associated with desktop VMs, where the custom resource template includes custom settings for virtual hardware resources of the desktop VMs; transmitting the custom settings to one or more VM management servers that manage the desktop VMs; remotely connecting to the VM management servers; powering off the desktop VMs; setting the virtual hardware resources of the desktop VMs to the custom settings; and powering on the desktop VMs.

Further embodiments of the present invention include a non-transitory computer-readable storage medium comprising instructions that cause a computer system to carry out one or more of the above methods as well as a computer system configured to carry out one or more of the above methods.

Advantageously, automating and streamlining the customization process enables efficient and accurate individualization of desktop VMs. By contrast, to achieve such customization using conventional techniques requires tedious and error-prone manual intervention as well as additional storage and time-consuming recompose or recreation operations. Consequently, the disclosed techniques decrease both the storage required and the time required to individualize desktop VMs.

BRIEF DESCRIPTION OF THE DRAWINGS

FIGS. 2A and 2B are conceptual diagrams that illustrate virtual hardware resource settings for full clone desktop VMs and linked clone desktop VMs, according to an embodiment.

DETAILED DESCRIPTION

Figure 1A:
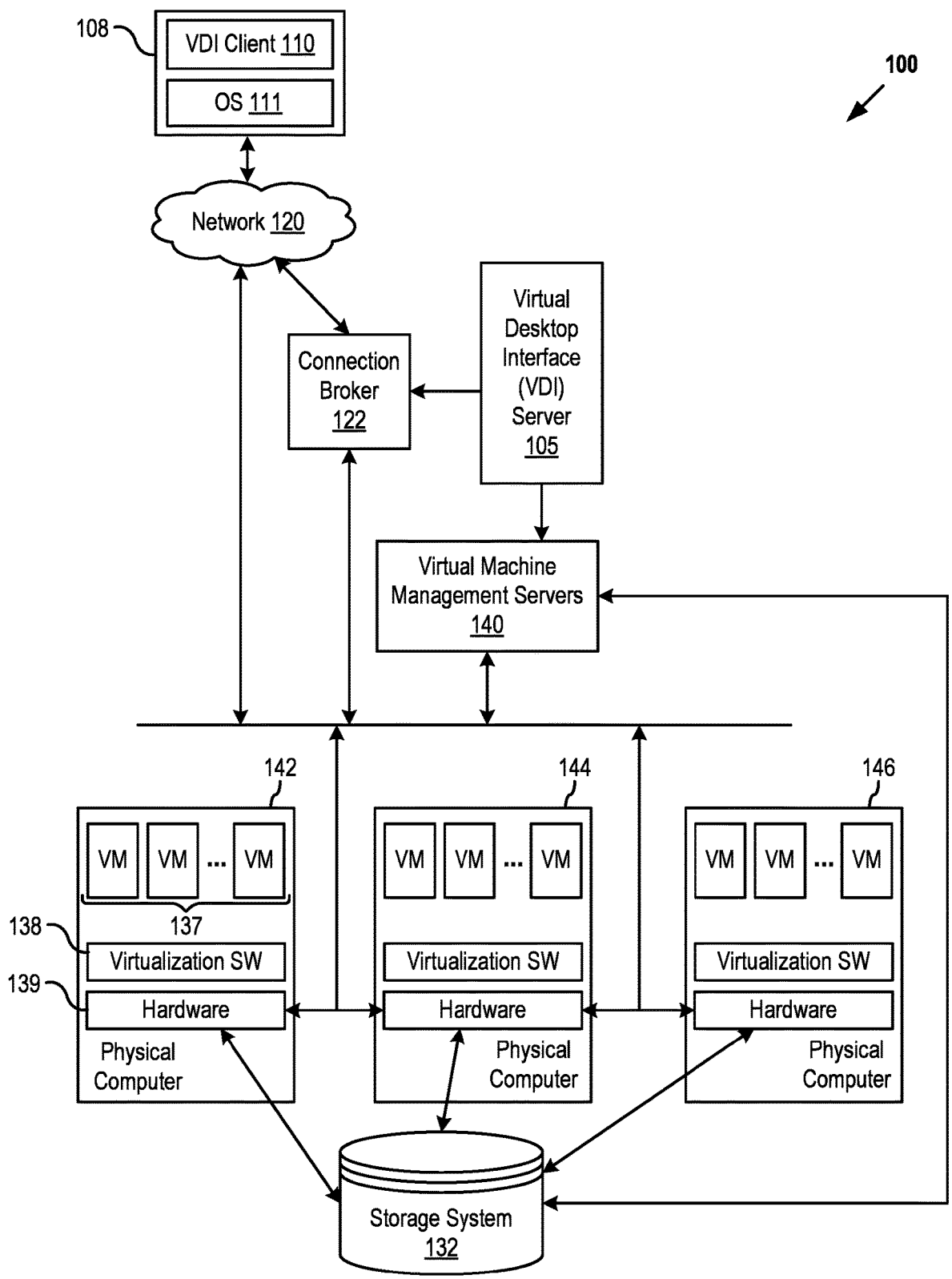
FIG. 1A illustrates components of a virtualized desktop infrastructure system in which one or more embodiments of the present invention may be implemented.

FIG. 1A illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 108 on top of an operating system (OS) 111. VDI clients 110 provides an interface for the users to access their desktops, which may be running in one of virtual machines (VMs) 137 or blade server (not shown) in a data center that is remote from the user locations via VDI server 105. In general, VDI server 105 enables desktop operating systems and applications to execute inside VMs 137. In one embodiment, the VM management servers are VMware® vCenter™ servers. A desktop operating system executing inside a VM is referred to herein as a desktop VM. With VDI clients 110 and VDI server 105, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a connection broker 122 that manages connections between VDI clients and desktops running in VMs 137 or other platforms. Connection broker 122 runs in virtual machines VMs 137 and is configured to manage connections to remote user sessions such as remote desktops. In the embodiments of the present invention VMs 137 are instantiated on a plurality of physical computers 142, 144, 146, each of which includes virtualization software 138 and hardware 139, is controlled by a virtual machine management (VMM) server 140, and is coupled to a shared persistent storage system 132. VDI system 100 may include any number of VMM servers 140, and each VMM server 140 may control any number of VMs 137.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Figure 1B:
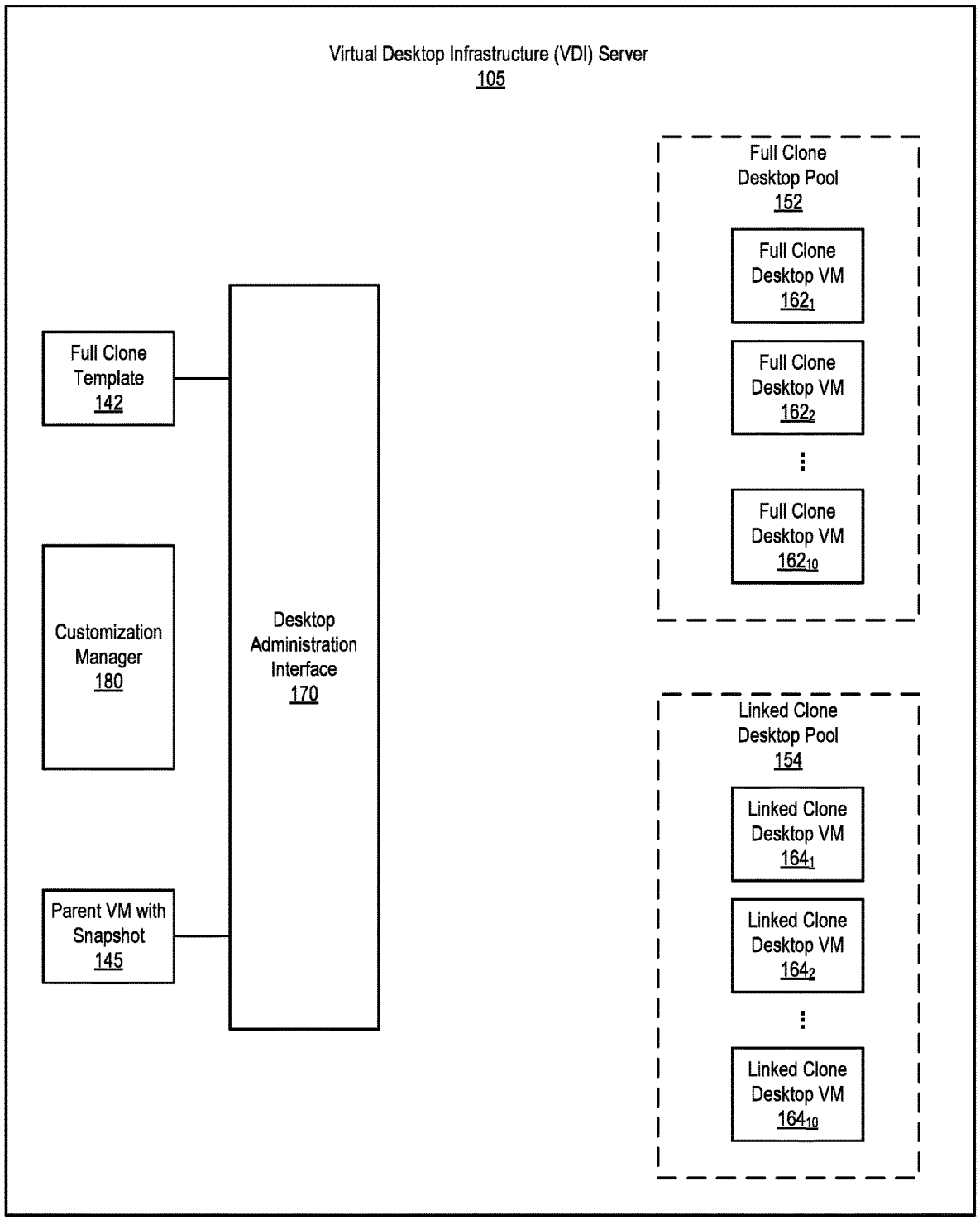
FIG. 1B is a conceptual diagram of virtual desktop infrastructure server that is configured to individualize virtual hardware resources of full clone desktop virtual machines (VMs) and linked clone desktop VMs, according to one or more embodiments.

FIG. 1B is a conceptual diagram of virtual desktop infrastructure (VDI) server 105 that is configured to individualize virtual hardware resources of full clone desktop virtual machines VMs 162 and linked clone desktop VMs 164, executing inside VMs 137.

A desktop administration interface 170 enables the user to deploy and manage a full clone desktop pool 152 and a linked clone desktop pool 154 in a centralized fashion. In operation, desktop administration interface 170 uses a full clone template 142 as the source for full clone desktop pool 152 that includes ten full clone desktops VMs $162_{1-10}$. Similarly, desktop administration interface 170 uses a parent VM with snapshot 145 as the source of a replica VM—the parent VM for linked clone desktop pool 154 that includes ten linked clone desktop VMs $164_{1-10}$. After creation, full clone desktop VMs 162 operate independently of each other. By contrast, linked clone desktop VMs 164 share virtual disks with the replica VM. In alternate embodiments, VDI server 105 may include any number (including 0) and combination of full clone templates 142, full clone desktop pools 152, parent VM with snapshots 145, replica VMs, and linked clone desktop pools 154. Further, each full clone desktop pool 152 may include any number of full clone desktop VMs 162 and the number may vary between different full clone desktop pools 152. Each linked clone desktop pool 154 may include any number of linked clone desktop VMs 164 and the number may vary between different linked clone desktop pools 154.

By centralizing and automating management of full clone desktops VMs 162 and linked clone desktops 164, desktop administration interface 170 reduces the time required to setup and maintain full clone desktop pool 152 and linked clone desktop pool 154. For instance, an administrator may use desktop administration interface 170 to automate the installation of patches and updates on full clone desktop VMs 162 and linked clone desktop VMs 164 by either modifying full clone template 142 (to affect full clone desktop VMs 162) or Parent VM with snapshot 145 (to affect linked clone desktop VMs 164)

However, to optimally support various users and tasks, it is also desirable to individualize virtual hardware resources (e.g., number of virtual CPUs, amount of virtual memory, etc.) across full clone desktop VMs 162 and linked clone desktop VMs 164. Further, because installing patches and updates removes any customized virtual hardware resource settings, restoring these customized settings after patches or updates are installed is integral to providing a comprehensive customization solution. For this reason, embodiments provide a customization manager 180 that is programmed to automate and streamline individualization of virtual hardware resources for any number of full clone desktop VMs 162 and linked clone desktop VMs 164. Customization manager 180 also automates the process of re-customizing individualized virtual hardware resources after updates and patches.

In some embodiments, customization manager 180 may automate additional processes as stand-alone operations or in combination with the customization process. For instance, customization manager 180 may automate a combined restore and re-configure process. In other embodiments, customization manager 180 initially customizes virtual hardware resources, but does not automate the re-customizing of individual virtual hardware resources.

Inputs to customization manager 180 include custom resource templates that the user creates to specify customized settings for virtual hardware resources for targeted full clone desktop VMs 162 and/or linked clone desktop VMs 164. In operation, customization manager 180 reads the custom resource templates and then applies the settings to the targeted full clone desktop VMs 162 and linked clone desktop VMs 164 without manual intervention. In some embodiments, customization manager 180 restores the individualized settings in response to a notification by desktop administration interface 170—reapplying the individualized settings on the designated linked clone desktop VMs 164 or full clone desktop VMs 162.

FIGS. 2A and 2B are conceptual diagrams that illustrate virtual hardware resource settings for full clone desktop VMs 162 and linked clone desktop VMs 164, according to one or more embodiments. Only subsets of virtual hardware resources settings are depicted. In general, virtual hardware resource settings may represent any number and type of configurable virtual hardware resources in any combination. The configurable virtual hardware resources may include, among other things, the number of virtual central processing units (annotated as "CPU"), the amount of virtual memory (annotated as "RAM"), the amount of virtual video memory, a virtual network interface card, and one or more virtual hard disks (annotated as "HDD1" and "HDD2").

FIG. 2A shows virtual hardware resource settings that are established by desktop administration interface 170 prior to customization manager 180 executing individualization operations. FIG. 2B shows virtual hardware resources settings after customization manager 180 has applied a custom resource template $210_1$ to targeted full clone desktop VMs 162 and a custom resource template $210_2$ to targeted linked clone desktop VMs 164.

As shown in FIG. 2A, full clone desktops VMs $162_{1-10}$ (labelled as "FC1-FC10") included in full clone desktop pool 152 (labelled as "FC1") are configured with one virtual central processing unit (CPU), a virtual hard drive, and 1 GB virtual memory. Linked clone desktop VMs $164_{1-10}$ (labelled as "L1-L10") included in linked clone desktop pool 154

(labelled as "LC1") are configured with one virtual CPU, a virtual hard drive, and 1 GB virtual memory.

As shown in FIG. 2B, customization manager 180 has individualized full clone desktops VMs 162$_1$ and 162$_{10}$ based on custom resource template 210$_1$ (labelled as "T1") that resides in full clone desktop pool 152. In addition, customization manager 180 has individualized linked clone desktop VMs 164$_1$ and 164$_2$ based on custom resource template 210$_2$ (labelled as "T2") that resides in linked clone desktop pool 154. For illustrative purposes, FIG. 2B highlights in bold the virtual hardware resource settings that differ from the original virtual resource hardware settings. In general, custom resource templates 210 are input text files that are generated by the administrator to reflect priorities and/or expected use patterns that vary across desktop pools. In various embodiments, the administrator, desktop administration interface 170, or customization manager 180 copies the custom resource template 210 to the appropriate desktop pool.

Custom resource template 210$_1$ specifies that full clone desktop VMs 162$_1$ and 162$_{10}$, included in full clone desktop pool 152, are to receive a customized virtual resource setting of 4 GB for the virtual memory. Similarly, custom resource template 210$_2$ specifies that linked clone desktop VMs 164$_1$ and 164$_{10}$, included in linked clone desktop pool 154 are to receive two customized virtual resource settings: 2 virtual CPUs and an additional virtual hard drive. As detailed in the method steps of FIG. 3, customization manager 180 has applied the appropriate customized virtual resource settings to full clone desktop VMs 162$_1$ and 162$_{10}$ and linked clone desktop VMs 164$_1$ and 164$_2$, but not to full clone desktop VMs 162$_{2-9}$ nor to linked clone desktop VMs 164$_{3-10}$.

Figure 3:
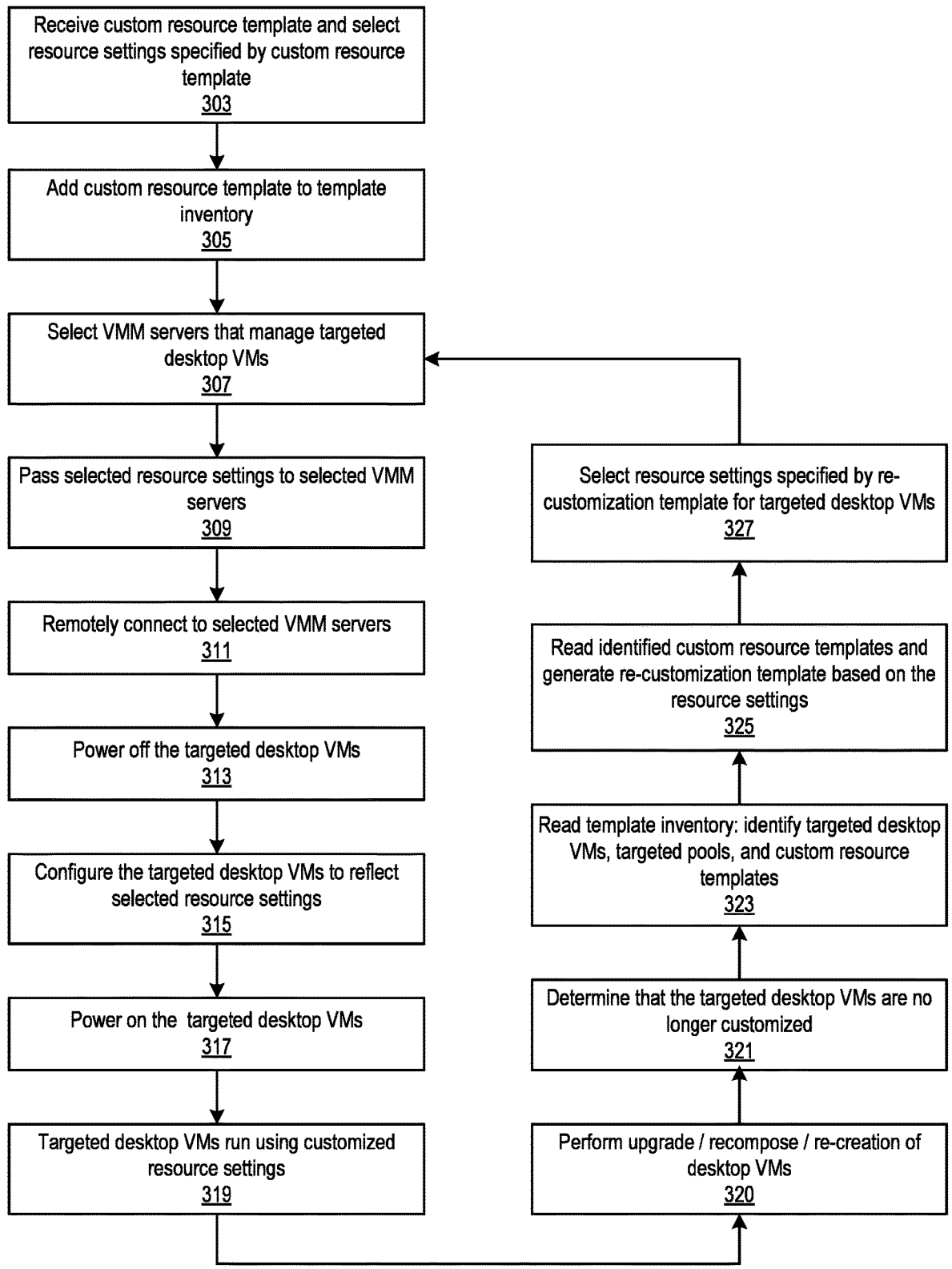
FIG. 3 illustrates a method for customizing virtual hardware resources across deployed desktop VMs, according to an embodiment.

FIG. 3 illustrates a method for customizing virtual hardware resources across deployed desktop VMs, according to an embodiment. Although this method is described for template 210$_2$, linked clone desktop pool 154, and linked clone desktop VMs 164, the same method steps are followed for template 210$_1$, full clone desktop pool 152, and full clone desktop VMs 162. Further, the steps are applied to any number and combination of templates 210, full clone pools 152, linked clone pools 154, full clone desktop VMs 162, and linked clone desktop VMs 164. Typically, all templates 210 are processed in one pass through the method steps.

As shown, this method begins at step 303, where customization manager 180 receives custom resource template 210$_2$. Customization manager 180 reads custom resource template 210$_2$ to determine targeted linked clone desktop VMs 164 and select the corresponding custom virtual resource settings. In some embodiments, customization manager 180 also determines that linked clone desktop pool 154 includes targeted linked clone desktop VMs 164 and then copies custom resource template 210$_2$ to targeted linked clone desktop pool 154. In other embodiments, resource template 210$_2$ is already included in targeted linked clone desktop pool 154.

At step 305, customization manager 180 adds custom resource template 210$_2$ to a template inventory that is created and maintained by customization manager 180. More specifically, customization manger 180 adds a group of identifiers for custom resource template 210$_2$, targeted linked clone desktop pool 154, and targeted linked clone desktop VMs 164 to the template inventory. Notably, at any given time, the template inventory is an archive of custom resource templates 210 that customization manger 180 has applied or is in the process of applying to full clone pools 152 and linked clone pools 154. By preserving such information, customization manager 180 is capable of reproducing the customized virtual resource settings after such settings have been overwritten by the original virtual resource settings. Such a scenario often occurs after a recompose operation that is performed as part of upgrading or patching linked clone desktop pool 154. Similarly, custom resource settings for full clone desktop pool 152 are lost during a re-creation operation that is performed to upgrade or patch full clone desktop VMs 162.

At step 307, customization manager 180 selects one or more VMM servers 140 that manage targeted linked clone desktop VMs 164. At step 309, customization manager 180 transmits the selected virtual resource settings to the selected VMM servers 140. At step 311, customization manager 180 remotely connects to the selected VMM servers 140. Customization manager 180 then powers off targeted linked clone desktop VMs 164 (step 313), applies the selected resource settings to targeted linked clone desktop VMs 164 (step 315), and powers on targeted linked clone desktop VMs 164 (step 317). Targeted linked clone desktop VMs 164 now reflect the selected virtual resource settings. At step 319, linked clone desktop VMs 164 operate with virtual resource configurations that vary across linked clone desktop pool 154 until an upgrade, recompose, or re-creation operation is performed on linked clone desktop VMs 164 (step 320).

At step 321, customization manager 180 determines that the targeted linked clone desktop VMs 164 no longer reflect custom resource template 210$_2$. Customization manager 180 may be configured to determine that the customized resource settings have been lost in any technically feasible fashion. For instance, in some embodiments, customization manager 180 determines that the customized virtual resources have been overwritten based on receiving a re-customization request from the user. In other embodiment, customization manager 180 may determine that full clone desktop VMs 162 have been re-created and/or targeted linked clone desktop VMs 164 have been recomposed.

At step 323, customization manager 180 reads the template inventory to identify custom resource template 210$_2$, corresponding targeted linked clone desktop pool 154, and corresponding targeted linked clone desktop VMs 164. If, at this point in time, customization manager 180 has processed custom resource template 210$_1$, then customization manager 180 also uses the template inventory to identify custom resource template 210$_1$, corresponding targeted full clone desktop pool 152, and corresponding targeted full clone desktop VMs 162. In general, as part of step 323, customization manager 180 reads the template inventory to determine all archived custom resource templates 210 and the applicable targets.

At step 325, customization manager 180 reads custom resource template 210$_2$ and generates a re-customization template based on the virtual resource settings included in custom resource template 210$_2$. The re-customization template is a text file that includes the information necessary to restore the customized virtual resource settings across targeted full clone desktop VMs 162 in targeted full clone desktop pool 152, and linked clone desktop VMs 164 in targeted linked clone desktop poll 154, In some embodiments, as part of step 325, customization manager 180 may prune the virtual resource settings prior to writing the re-customization template, removing resource settings that are unaltered by patches and/or upgrades to full clone desktop VMs 162 and linked clone desktop VMs 164. For instance, two virtual hard drives are not typically replaced with a single virtual hard drive during recompose and re-creation operations.

This method then returns to step 307, where customization manager 180 reconfigures linked clone desktop VMs 164. Customization manager 180 continues to re-execute steps 307-327, ensuring that individualized settings for full clone desktop VMs 162 and linked clone desktop VMs 164 are maintained.

Figure 4:
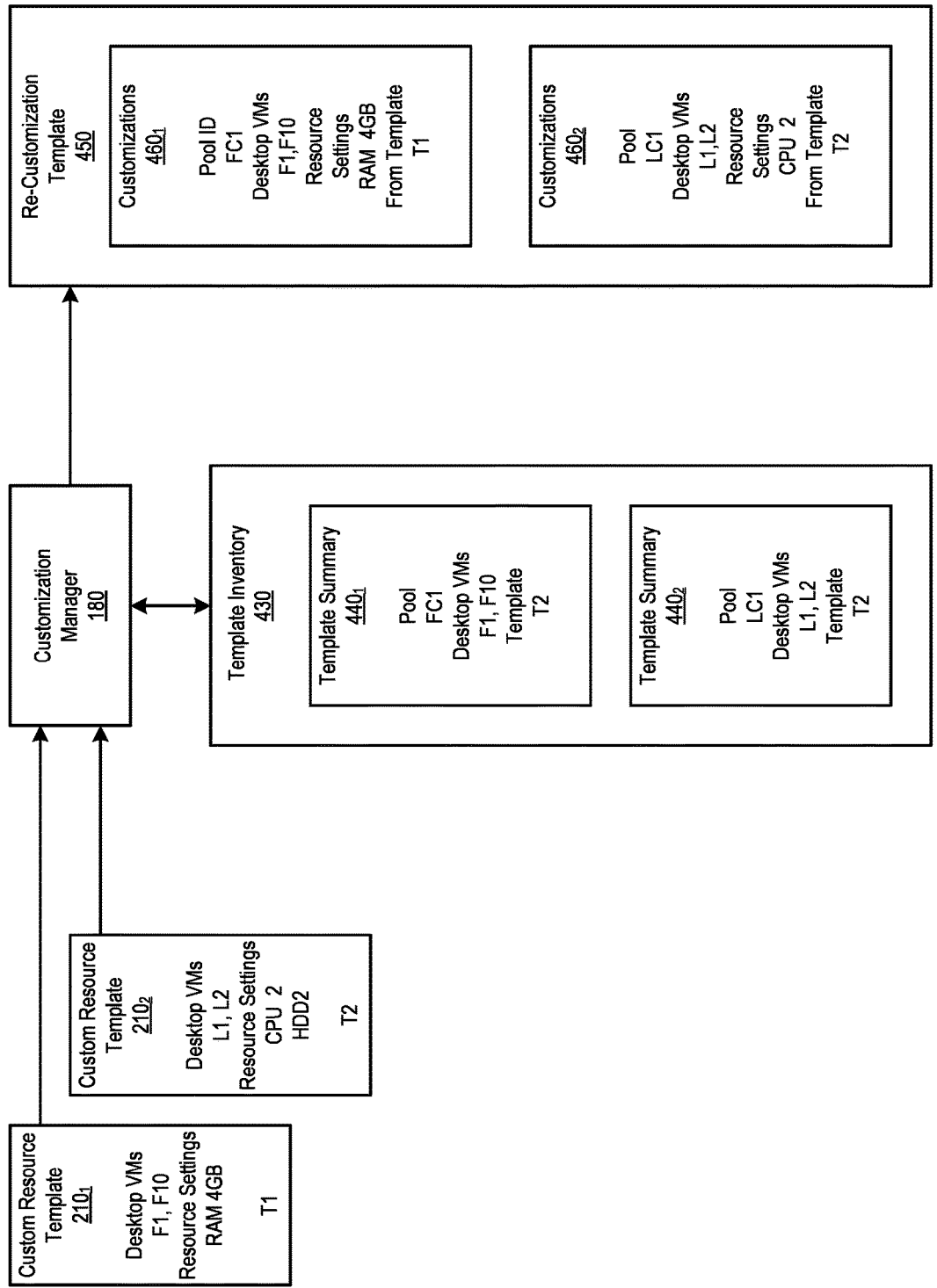
FIG. 4 is a conceptual diagram that illustrates inputs to a customization manager and the resulting outputs, according to an embodiment.

FIG. 4 is a conceptual diagram that illustrates inputs to customization manager 180 and the resulting outputs, according to an embodiment. As shown, customization manager 180 reads custom resource templates 210. Customization manager 180 writes template inventory 430, encapsulating each custom resource template 210 as a separate template summary 440. Subsequently, to restore resource settings that have been overwritten, customization manager 180 reads template inventory 430, extracting each template summary 440. Customization manager 180 then re-reads custom resource templates 210, and based on template summary 440 and custom resource templates 210, writes re-customization template 450—including a customizations 460 for each template summary 440.

Notably, because the virtual hard drive that is included in custom resource $210_2$ is not lost when patches/or upgrades are applied, customization manager 180 omits this setting from customizations $460_2$ included in re-customization template 450. In general, customization manager 180 is configured to optimize the re-customization template 450 to exclude irrelevant information.

Advantageously, by automating the customization process, including archiving applied templates and restoring customized settings that are overwritten, customization manager 180 requires less time, effort, and memory to correctly maintain individualized virtual hardware resource settings compared to conventional techniques. For example, unlike conventional, primarily manual customization techniques, customization manger 180 does not proliferate replica VMs and/or full clone templates 142. Further, by eliminating many manual operations, customization manager 180 reduces the likelihood of errors attributable to customizing full clone desktops 162 and/or linked clone desktops 164, maintaining an inventory list of customizations, and re-customizing full clone desktops 162 and/or linked clone desktops 164 after customizations have been lost.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of customizing virtual hardware resources for desktop virtual machines (VMs), comprising:
receiving a first custom resource template, wherein the first custom resource template specifies at least (a) a first plurality of desktop VMs that are a subset of a pool of desktop VMs, wherein desktop VMs in the pool of desktop VMs are either full clone VMs created from a full clone template or linked clone VMs created from a parent VM and snapshot, and wherein each of the desktop VMs in the pool of desktop VMs is created with the same original settings for virtual hardware resources of the desktop VM, and (b) custom settings for virtual hardware resources of the first plurality of desktop VMs that differ from the original settings;

powering off the first plurality of desktop VMs;

setting the virtual hardware resources of the first plurality of desktop VMs to the custom settings for the virtual hardware resources of the first plurality of desktop VMs specified in the first custom resource template; and powering on the first plurality of desktop VMs.

2. The method of claim 1, further comprising adding, to a template inventory, a representation of the first custom resource template.

3. The method of claim 1, wherein the first custom resource template is a text file.

4. The method of claim 1, wherein the first custom resource template is copied to the pool of desktop VMs.

5. The method of claim 1, further comprising:

receiving a second custom resource template that includes custom settings for virtual hardware resources of a second plurality of desktop VMs;

configuring the second plurality of desktop VMs to reflect the custom settings for the virtual hardware resources of the second plurality of desktop VMs included in the second custom resource template; and adding a representation of the second custom resource template to a template inventory.

6. The method of claim 5, wherein a first virtual hardware resource setting included in the custom settings for the virtual hardware resources of the first plurality of desktop VMs in the first custom resource template is also included in the custom settings for the virtual hardware resources of the second plurality of desktop VMs in the second custom resource template.

7. The method of claim 5, wherein none of the custom settings for the virtual hardware resources of the first plurality of desktop VMs in the first custom resource template are included in the custom settings for the virtual hardware resources of the second plurality of desktop VMs in the second custom resource template.

8. The method of claim 5, wherein both the first plurality of desktop VMs and the first custom resource template are included in the pool of desktop VMs, and further comprising adding a representation of the first custom resource template to the template inventory comprising:

storing in the template inventory a template summary, wherein the template summary includes an identifier for the pool of desktop VMs, identifiers for the first plurality of desktop VMs, and an identifier for the first custom resource template.

9. The method of claim 5, further comprising setting the virtual hardware resources of the first plurality of desktop VMs to the custom settings again including:

receiving a request to re-customize the first plurality of desktop VMs and in response thereto, generating a re-customization template based on at least the representation of the first custom resource template, wherein the re-customization template includes selected custom settings for the virtual hardware resources of the first plurality of desktop VMs; and re-configuring the virtual hardware resources of the first plurality of desktop VMs to reflect the selected custom settings in the re-customization template.

10. The method of claim 9, wherein the re-customization template is a text file.

11. The method of claim 9, wherein generating the re-customization template comprises:

reading the template inventory and extracting a first template summary that specifies the first plurality of desktop VMs, the first custom resource template, and the pool of desktop VMs that includes both the first plurality of desktop VMs and the first custom resource template;

reading the first custom resource template and selecting one or more of the custom settings for the virtual hardware resources of the first plurality of desktop VMs; and writing first re-customization details to the re-customization template, wherein the first re-customization details include the pool of desktop VMs, the first plurality of desktop VMs, and the selected custom settings.

12. The method of claim 11, wherein the custom settings for the virtual hardware resources of the first plurality of desktop VMs include a virtual hard disk, and selecting one or more of the custom settings comprises selecting all the custom settings except the virtual hard disk.

13. The method of claim 11, wherein re-configuring the first plurality of desktop VMs comprises:

transmitting the selected custom settings for the virtual hardware resources of the first plurality of desktop VMs to one or more VM management servers that manage the first plurality of desktop VMs;

remotely connecting to the VM management servers that manage the first plurality of desktop VMs;

powering off the first plurality of desktop VMs;

resetting the virtual hardware resources of the first plurality of desktop VMs to the selected custom settings for the virtual hardware resources of the first plurality of desktop VMs; and powering on the first plurality of desktop VMs.

14. The method of claim 1, further comprising:

transmitting the custom settings to one or more VM management servers that manage the first plurality of desktop VMs; and remotely connecting to the one or more VM management servers that manage the first plurality of desktop VMs.

15. A non-transitory computer-readable storage medium comprising instructions, which when executed in a computer system causes the computer system to carry out steps comprising:

receiving a first custom resource template, wherein the first custom resource template specifies at least (a) a first plurality of desktop VMs that are a subset of a pool of desktop VMs, wherein desktop VMs in the pool of desktop VMs are either full clone VMs created from a full clone template or linked clone VMs created from a parent VM and snapshot, and wherein each of the desktop VMs in the pool of desktop VMs is created with the same original settings for virtual hardware resources of the desktop VM, and (b) custom settings for virtual hardware resources of the first plurality of desktop VMs that differ from the original settings;

powering off the first plurality of desktop VMs;

setting the virtual hardware resources of the first plurality of desktop VMs to the custom settings for the virtual hardware resources of the first plurality of desktop VMs specified in the first custom resource template; and powering on the first plurality of desktop VMs.

16. The non-transitory computer-readable storage medium of claim 15, the steps further comprising:
adding, to a template inventory, a representation of the first custom resource template.

17. The non-transitory computer-readable storage medium of claim 15, the steps further comprising:
receiving a second custom resource template that includes custom settings for virtual hardware resources of a second plurality of desktop VMs;
configuring the second plurality of desktop VMs to reflect the custom settings for the virtual hardware resources of the second plurality of desktop VMs included in the second custom resource template;
adding a representation of the second custom resource template to a template inventory; and
setting the virtual hardware resources of the first plurality of desktop VMs to the custom settings again based on at least the first custom resource template including:
receiving a request to re-customize the first plurality of desktop VMs, and in response thereto, generating a re-customization template based on at least the representation of the first custom resource template, wherein the re-customization template includes selected custom settings for the virtual hardware resources of the first plurality of desktop VMs, and
re-configuring the virtual hardware resources of the first plurality of desktop VMs to reflect the selected custom settings in the re-customization template.

18. A computer system comprising:
a memory configured to store instructions; and
one or more processors, wherein the one or more processors are configured to perform the instructions to:
execute a customization manager configured to support customization of virtual hardware resources of desktop virtual machines (VMs), wherein the customization manager is configured to:
receive custom resource templates, wherein each of the custom resource templates specifies at least (a) an associated plurality of desktop VMs that are a subset of a pool of desktop VMs, wherein desktop VMs in the pool of desktop VMs are either full clone VMs created from a full clone template or linked clone VMs created from a parent VM and snapshot, and wherein each of the desktop VMs in the pool of desktop VMs is created with the same original settings for virtual hardware resources of the desktop VM, and (b) custom settings for virtual hardware resources of the associated plurality of desktop VMs that differ from the original settings, and
reconfigure one or more of the desktop VMs based on at least the custom settings for virtual hardware resources specified in the custom resource templates.

19. The computer system of claim 18, wherein the customization manager is further configured to:
add, to a template inventory, representations of the custom resource templates.

20. The computer system of claim 18, wherein the customization manager is further configured to determine that virtual hardware resources of the reconfigured one or more of the desktop VMs no longer reflect the custom settings specified in the custom resource templates including determining a recompose or re-creation operation has been performed on the reconfigured one or more of the desktop VMs.

* * * * *